United States Patent [19]

Fletcher et al.

[11] 3,718,863

[45] Feb. 27, 1973

[54] M-ARY LINEAR FEEDBACK SHIFT REGISTER WITH BINARY LOGIC

[76] Inventors: James C. Fletcher, Administrator of the National Aeronautics and Space Administration with respect to an invention of; Marvin Perlman, 1100 Dempsey Ave., Granada Hills, Calif. 91344

[22] Filed: Oct. 26, 1971

[21] Appl. No.: 192,101

[52] U.S. Cl. ....................328/37, 307/221 R, 328/61, 328/187

[51] Int. Cl. ..........................G11c 19/00, H03k 23/00

[58] Field of Search ...........307/221; 328/61, 37, 187

[56] References Cited

UNITED STATES PATENTS

| | | | |
|---|---|---|---|
| 3,069,657 | 12/1962 | Green, Jr. et al. | 307/221 R |
| 3,439,279 | 4/1969 | Guanella | 328/37 X |

*Primary Examiner*—John Zazworsky
*Attorney*—Monte F. Mott et al.

[57] ABSTRACT

A family of *m*-ary linear feedback shift registers with binary logic is disclosed. Each *m*-ary linear feedback shift register with binary logic generates a binary representation of a nonbinary recurring sequence, producable with a *m*-ary linear feedback shift register without binary logic in which *m* is greater than 2. The state table of a *m*-ary linear feedback shift register without binary logic, utilizing sum modulo *m* feedback, is first tabulated for a given initial state. The entries in the state table are coded in binary and the binary entries are used to set the initial states of the stages of a plurality of binary shift registers. A single feedback logic unit is employed which provides a separate feedback binary digit to each binary register as a function of the states of corresponding stages of the binary registers. The stages of the binary registers which are fed back depend upon the stages which are fed back through nonzero multipliers in the *m*-ary linear feedback shift register, utilizing sum modulo-*m* feedback.

11 Claims, 12 Drawing Figures

MARVIN PERLMAN
*INVENTOR.*

BY Paul F. McCaul
Monte F. Mott
ATTORNEYS

FIG. 3

| k | $a_{k-1}$ | $a_{k-2}$ | $a_{k-3}$ | $a_k$ | $x_{k-1}$ | $y_{k-1}$ | $x_{k-2}$ | $y_{k-2}$ | $x_{k-3}$ | $y_{k-3}$ | $x_k$ | $y_k$ |
|---|---|---|---|---|---|---|---|---|---|---|---|---|
| 0 | 0 | 0 | 2 | 1 | 0 | 0 | 0 | 0 | 1 | 0 | 0 | 1 |
| 1 | 1 | 0 | 0 | 1 | 0 | 1 | 0 | 0 | 0 | 0 | 0 | 1 |
| 2 | 1 | 1 | 0 | 1 | 0 | 1 | 0 | 1 | 0 | 0 | 0 | 1 |
| 3 | 1 | 1 | 1 | 0 | 0 | 1 | 0 | 1 | 0 | 1 | 0 | 0 |
| 4 | 0 | 1 | 1 | 2 | 0 | 0 | 0 | 1 | 0 | 1 | 1 | 0 |
| 5 | 2 | 0 | 1 | 1 | 1 | 0 | 0 | 0 | 0 | 1 | 0 | 1 |
| 6 | 1 | 2 | 0 | 1 | 0 | 1 | 1 | 0 | 0 | 0 | 0 | 1 |
| 7 | 1 | 1 | 2 | 2 | 0 | 1 | 0 | 1 | 1 | 0 | 1 | 0 |
| 8 | 2 | 1 | 1 | 1 | 1 | 0 | 0 | 1 | 0 | 1 | 0 | 1 |
| 9 | 1 | 2 | 1 | 0 | 0 | 1 | 1 | 0 | 0 | 1 | 0 | 0 |
| 10 | 0 | 1 | 2 | 1 | 0 | 0 | 0 | 1 | 1 | 0 | 0 | 1 |
| 11 | 1 | 0 | 1 | 0 | 0 | 1 | 0 | 0 | 0 | 1 | 0 | 0 |
| 12 | 0 | 1 | 0 | 0 | 0 | 0 | 0 | 1 | 0 | 0 | 0 | 0 |
| 13 | 0 | 0 | 1 | 2 | 0 | 0 | 0 | 0 | 0 | 1 | 1 | 0 |
| 14 | 2 | 0 | 0 | 2 | 1 | 0 | 0 | 0 | 0 | 0 | 1 | 0 |
| 15 | 2 | 2 | 0 | 2 | 1 | 0 | 1 | 0 | 0 | 0 | 1 | 0 |
| 16 | 2 | 2 | 2 | 0 | 1 | 0 | 1 | 0 | 1 | 0 | 0 | 0 |
| 17 | 0 | 2 | 2 | 1 | 0 | 0 | 1 | 0 | 1 | 0 | 0 | 1 |
| 18 | 1 | 0 | 2 | 2 | 0 | 1 | 0 | 0 | 1 | 0 | 1 | 0 |
| 19 | 2 | 1 | 0 | 2 | 1 | 0 | 0 | 1 | 0 | 0 | 1 | 0 |
| 20 | 2 | 2 | 1 | 1 | 1 | 0 | 1 | 0 | 0 | 1 | 0 | 1 |
| 21 | 1 | 2 | 2 | 2 | 0 | 1 | 1 | 0 | 1 | 0 | 1 | 0 |
| 22 | 2 | 1 | 2 | 0 | 1 | 0 | 0 | 1 | 1 | 0 | 0 | 0 |
| 23 | 0 | 2 | 1 | 2 | 0 | 0 | 1 | 0 | 0 | 1 | 1 | 0 |
| 24 | 2 | 0 | 2 | 0 | 1 | 0 | 0 | 0 | 1 | 0 | 0 | 0 |
| 25 | 0 | 2 | 0 | 0 | 0 | 0 | 1 | 0 | 0 | 0 | 0 | 0 |

MARVIN PERLMAN
*INVENTOR.*

*BY* Paul F. McCaul
Monte F. Mott
ATTORNEYS

FIG. 5

| k | $a_{k-1}$ | $a_{k-2}$ | $a_k$ |
|---|---|---|---|
| 0 | 1 | 9 | 0 |
| 1 | 0 | 1 | 1 |
| 2 | 1 | 0 | 1 |
| 3 | 1 | 1 | 2 |
| 4 | 2 | 1 | 3 |
| 5 | 3 | 2 | 5 |
| 6 | 5 | 3 | 8 |
| 7 | 8 | 5 | 3 |
| 8 | 3 | 8 | 1 |
| 9 | 1 | 3 | 4 |
| 10 | 4 | 1 | 5 |
| 11 | 5 | 4 | 9 |
| 12 | 9 | 5 | 4 |
| 13 | 4 | 9 | 3 |
| 14 | 3 | 4 | 7 |
| 15 | 7 | 3 | 0 |
| 16 | 0 | 7 | 7 |
| 17 | 7 | 0 | 7 |
| 18 | 7 | 7 | 4 |
| 19 | 4 | 7 | 1 |
| 20 | 1 | 4 | 5 |
| 21 | 5 | 1 | 6 |
| 22 | 6 | 5 | 1 |
| 23 | 1 | 6 | 7 |
| 24 | 7 | 1 | 8 |
| 25 | 8 | 7 | 5 |
| 26 | 5 | 8 | 3 |
| 27 | 3 | 5 | 8 |
| 28 | 8 | 3 | 1 |
| 29 | 1 | 8 | 9 |
| 30 | 9 | 1 | 0 |

| k | $a_{k-1}$ | $a_{k-2}$ | $a_k$ |
|---|---|---|---|
| 31 | 0 | 9 | 9 |
| 32 | 9 | 0 | 9 |
| 33 | 9 | 9 | 8 |
| 34 | 8 | 9 | 7 |
| 35 | 7 | 8 | 5 |
| 36 | 5 | 7 | 2 |
| 37 | 2 | 5 | 7 |
| 38 | 7 | 2 | 9 |
| 39 | 9 | 7 | 6 |
| 40 | 6 | 9 | 5 |
| 41 | 5 | 6 | 1 |
| 42 | 1 | 5 | 6 |
| 43 | 6 | 1 | 7 |
| 44 | 7 | 6 | 3 |
| 45 | 3 | 7 | 0 |
| 46 | 0 | 3 | 3 |
| 47 | 3 | 0 | 3 |
| 48 | 3 | 3 | 6 |
| 49 | 6 | 3 | 9 |
| 50 | 9 | 6 | 5 |
| 51 | 5 | 9 | 4 |
| 52 | 4 | 5 | 9 |
| 53 | 9 | 4 | 3 |
| 54 | 3 | 9 | 2 |
| 55 | 2 | 3 | 5 |
| 56 | 5 | 2 | 7 |
| 57 | 7 | 5 | 2 |
| 58 | 2 | 7 | 9 |
| 59 | 9 | 2 | 1 |

MARVIN PERLMAN
*INVENTOR.*

BY Paul F. McCaul
Monte F. Mott
ATTORNEYS

FIG. 7
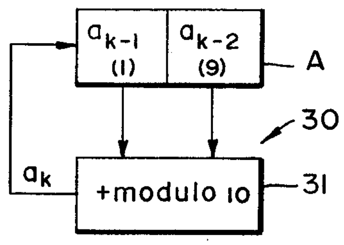
FIG. 5a
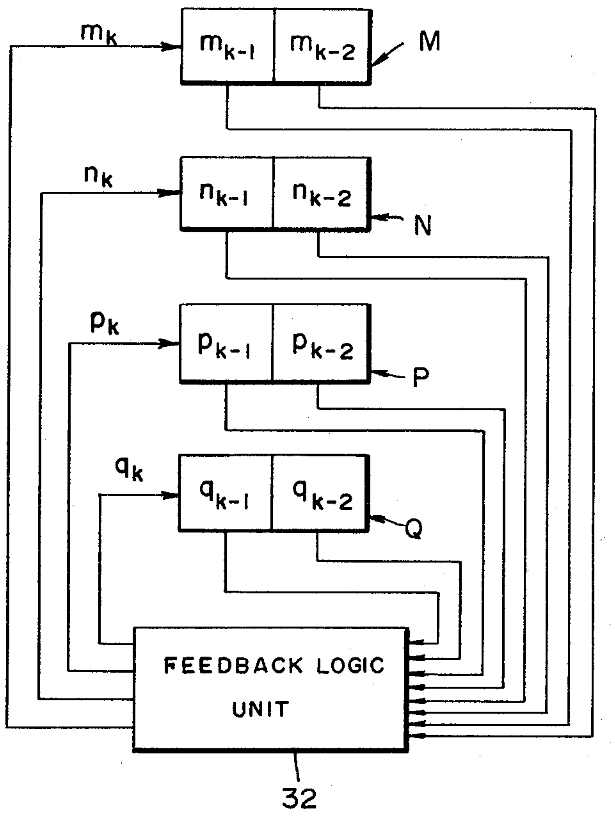
FIG. 6
| k | $m_{k-1}$ | $n_{k-1}$ | $p_{k-1}$ | $q_{k-1}$ | $m_{k-2}$ | $n_{k-2}$ | $p_{k-2}$ | $q_{k-2}$ | $m_k$ | $n_k$ | $p_k$ | $q_k$ |
|---|---|---|---|---|---|---|---|---|---|---|---|---|
| 0 | 0 | 0 | 0 | 1 | 1 | 0 | 0 | 1 | 0 | 0 | 0 | 0 |
| 1 | 0 | 0 | 0 | 0 | 0 | 0 | 0 | 1 | 0 | 0 | 0 | 1 |
| 2 | 0 | 0 | 0 | 1 | 0 | 0 | 0 | 0 | 0 | 0 | 0 | 1 |
| 3 | 0 | 0 | 0 | 1 | 0 | 0 | 0 | 1 | 0 | 0 | 1 | 0 |
| 4 | 0 | 0 | 1 | 0 | 0 | 0 | 0 | 1 | 0 | 0 | 1 | 1 |
| 5 | 0 | 0 | 1 | 1 | 0 | 0 | 1 | 0 | 0 | 1 | 0 | 1 |
| 6 | 0 | 1 | 0 | 1 | 0 | 0 | 1 | 1 | 1 | 0 | 0 | 0 |
| 7 | 1 | 0 | 0 | 0 | 0 | 1 | 0 | 1 | 0 | 0 | 1 | 1 |
| 8 | 0 | 0 | 1 | 1 | 1 | 0 | 0 | 0 | 0 | 0 | 0 | 1 |
| 9 | 0 | 0 | 0 | 1 | 0 | 0 | 1 | 1 | 0 | 1 | 0 | 0 |
| 10 | 0 | 1 | 0 | 0 | 0 | 0 | 0 | 1 | 0 | 1 | 0 | 1 |
*INVENTOR.*
MARVIN PERLMAN
BY Paul F. McCaul
Monte F. Mott
ATTORNEYS FIG. 8
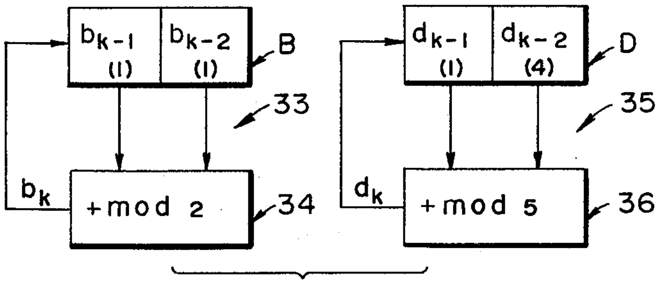
FIG. 9
| k | $b_{k-1}$ | $b_{k-2}$ | $b_k$ |
|---|---|---|---|
| 0 | 1 | 1 | 0 |
| 1 | 0 | 1 | 1 |
| 2 | 1 | 0 | 1 |
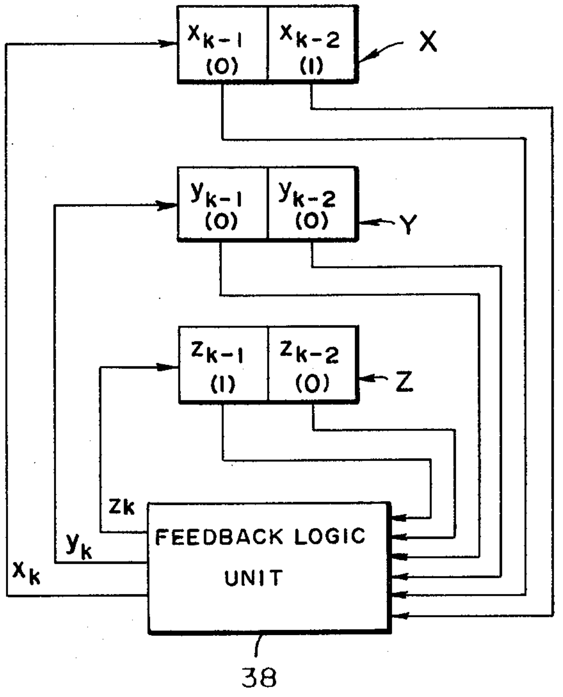
FIG. 11
MARVIN PERLMAN
*INVENTOR.*
BY
ATTORNEYS

FIG. 10

| $k$ | $d_{k-1}$ | $d_{k-2}$ | $d_k$ | $x_{k-1}$ | $y_{k-1}$ | $z_{k-1}$ | $x_{k-2}$ | $y_{k-2}$ | $z_{k-2}$ | $x_k$ | $y_k$ | $z_k$ |
|---|---|---|---|---|---|---|---|---|---|---|---|---|
| 0 | 1 | 4 | 0 | 0 | 0 | 1 | 1 | 0 | 0 | 0 | 0 | 0 |
| 1 | 0 | 1 | 1 | 0 | 0 | 0 | 0 | 0 | 1 | 0 | 0 | 1 |
| 2 | 1 | 0 | 1 | 0 | 0 | 1 | 0 | 0 | 0 | 0 | 0 | 1 |
| 3 | 1 | 1 | 2 | 0 | 1 | 1 | 0 | 0 | 1 | 0 | 1 | 0 |
| 4 | 2 | 1 | 3 | 0 | 1 | 0 | 0 | 0 | 1 | 0 | 1 | 1 |
| 5 | 3 | 2 | 0 | 0 | 1 | 1 | 0 | 1 | 0 | 0 | 0 | 0 |
| 6 | 0 | 3 | 3 | 0 | 0 | 0 | 0 | 1 | 1 | 0 | 1 | 1 |
| 7 | 3 | 0 | 3 | 0 | 1 | 1 | 0 | 0 | 0 | 0 | 1 | 1 |
| 8 | 3 | 3 | 1 | 0 | 1 | 1 | 0 | 1 | 1 | 0 | 0 | 1 |
| 9 | 1 | 3 | 4 | 0 | 0 | 1 | 0 | 1 | 1 | 1 | 0 | 0 |
| 10 | 4 | 1 | 0 | 1 | 0 | 0 | 0 | 0 | 1 | 0 | 0 | 0 |
| 11 | 0 | 4 | 4 | 0 | 0 | 0 | 1 | 0 | 0 | 1 | 0 | 0 |
| 12 | 4 | 0 | 4 | 1 | 0 | 0 | 0 | 0 | 0 | 1 | 0 | 0 |
| 13 | 4 | 4 | 3 | 1 | 0 | 0 | 1 | 0 | 0 | 0 | 1 | 1 |
| 14 | 3 | 4 | 2 | 0 | 1 | 1 | 1 | 0 | 0 | 0 | 1 | 0 |
| 15 | 2 | 3 | 0 | 0 | 1 | 0 | 0 | 1 | 1 | 0 | 0 | 0 |
| 16 | 0 | 2 | 2 | 0 | 0 | 0 | 0 | 1 | 0 | 0 | 1 | 0 |
| 17 | 2 | 0 | 2 | 0 | 1 | 0 | 0 | 0 | 0 | 0 | 1 | 0 |
| 18 | 2 | 2 | 4 | 0 | 1 | 0 | 0 | 1 | 0 | 1 | 0 | 0 |
| 19 | 4 | 2 | 1 | 1 | 0 | 0 | 0 | 1 | 0 | 0 | 0 | 1 |

MARVIN PERLMAN
*INVENTOR.*

*BY* Paul F. McCaul
Monte F. Mott
ATTORNEYS

M-ARY LINEAR FEEDBACK SHIFT REGISTER WITH BINARY LOGIC

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention is generally directed to linear feedback shift registers and, more particularly, to improvements therein.

2. Description of the Prior Art

The availability of high speed and reliable two-state or binary devices, such as flip-flops or binary storage cores, has led to the development of presently known binary linear feedback shift registers which provide binary recurring sequences. Briefly, a binary linear feedback shift register, hereafter often referred to as a binary LFSR, comprises a plurality of stages, definable as $r$, and a feedback unit which performs the modulo-2 addition on selected outputs of the stages. It feeds back the modulo-2 sum to the register's input stage. When proper stages are selected for feedback the length of the resulting sequence is $2^r-1$ and is referred to as a maximal length sequence. In the above expression $2 = m$, which is the number of states which each stage can assume.

Mathematically the present-day binary LFSR in which $m=2$, is one type of a large class of possible LFSRs in which $m$ is equal to an integer greater than 1, i.e., $m = 2$, 3, etc. The entire class can be described generally as an $m$-ary linear feedback shift register or $r$ stages with modulo-$m$ feedback. Selected ones of the $r$ stages are fed back through separate multipliers which multiply the stages' outputs by appropriate factors of 0 through $(m-1)$. Clearly, when $m=2$, the $m$-ary linear feedback shift register is a binary LFSR. Hereafter a $m$-ary linear feedback shift register which will be referred to as a $m$-ary LFSR is one in which $m$ is greater than 2, thereby excluding therefrom the binary LFSR case. In the $m$-ary LFSR when $m$ is equal to $p$, a prime integer, by proper selection of the feedback stages and the multiplication factors, a maximal length sequence $p^r-1$ can be generated for any $p$. When $m$ is not a prime, shorter than maximal length sequences can be realized.

Whenever $m$ is greater than 2, the resulting sequences are nonbinary recurring sequences. Such sequences have well understood properties and have wide potential use. Potential applications include ranging codes, error-detecting and error-correcting codes, counting scaling, prescribed sequence generation, memory paging, and associative memory organization.

To date nonbinary sequences have received little attention, since physical devices do not exist that are high speed and reliable and that are capable of assuming more than two states. Despite such hardware limitations the ability to generate nonbinary recurring sequences would represent a great advance in the state of the art.

OBJECTS AND SUMMARY OF THE INVENTION

It is a primary object of the present invention to provide means for generating nonbinary recurring sequences.

Another object of the present invention is to provide nonbinary recurring sequences with state-of-the-art storage devices.

A further object of the invention is to provide a $m$-ary linear feedback shift register for generating nonbinary recurring sequences with binary logic elements.

Still a further object of the invention is to provide a novel method of generating a nonbinary recurring sequence with binary logic elements.

These and other objects of the invention are achieved by coding in binary the state of each register stage which may assume any of $m$ states and the feedback digit which also may be of any one of $m$ values of a $m$-ary LFSR, where $m > 2$. The binary coded values provide a state or truth table used to design a plurality of parallel binary shift registers with interdependent feedback which simulate the behavior or the original $m$-ay LFSR. Generally the number of parallel shift registers is the number of binary bits needed for the binary representation of $m$. When $m$ is the product of primes, the number of parallel binary registers is the sum of the numbers of binary digits required to represent the various primes.

The novel features of the invention are set forth with particularity in the appended claims. The invention will best be understood from the following description when read in conjunction with the accompanying drawings.

BRIEF DESCRIPTION OF THE DRAWINGS

FIG. 3 is a state table of the register shown in FIG. 2 and its corresponding table in a binary code;

FIG. 5 is a state table of a 10-ary LFSR with sum modulo-10 feedback;

FIG. 5a is a block diagram of a 10-ary LFSR without binary logic, utilizing sum modulo-10 feedback;

FIG. 6 is a table in which the entries at $k=0$ through $k=10$ in the table of FIG. 5 are coded in binary;

FIG. 7 is one embodiment of a 10-ary LFSR with binary logic;

FIG. 8 is a diagram useful in explaining another embodiment of a 10-ary LFSR;

FIGS. 9 and 10 recited state tables of the linear feedback shift registers 33 and 35 respectively shown in FIG. 8; and FIG. 11 is a practical implementation of a 5-ary LFSR with binary logic, corresponding to register 35 of FIG. 8.

DESCRIPTION OF THE PREFERRED EMBODIMENTS

Figure 1:
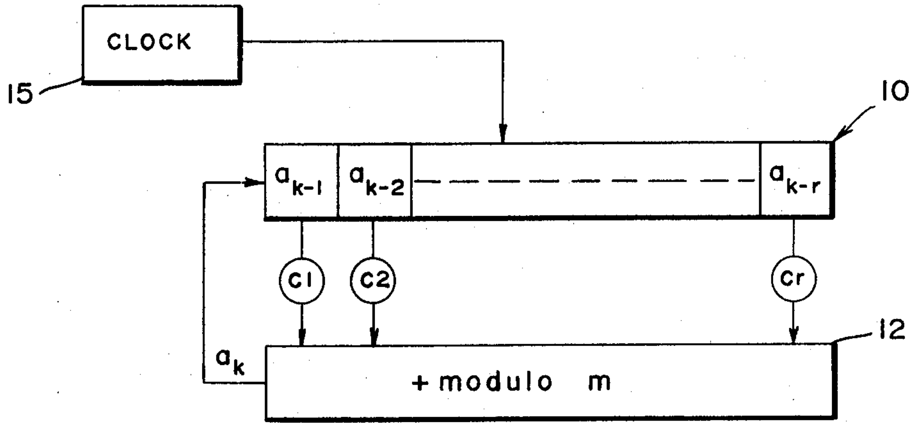
FIG. 1 is a simple block diagram of a general linear feedback shift register.

The present invention may best be understood by first describing a general linear feedback shift register, in which each register stage is capable of assuming any one of $m$ states, defined as states 0, 1, . . . , $m-1$. Such a register is shown in FIG. 1. The register 10 comprises $r$ stages, $a_{k-1} \ldots a_{k-r}$ connected through multipliers C1 . . . C$r$ to a modulo-$m$ feedback unit 12. Each of the multipliers may multiply the output of the state supplied thereto by any value from 0 to $m-1$. As is known the register is clocked by clock pulses from a clock 15 to thereby cycle the LFSR through the states associated with a desired sequence. To simplify the following figures, the clock 15 is deleted from the rest of the figures. As is further known the length of the sequence depends on $r$, $m$ and the multiplication factors of multipliers C1 through C$r$, as well as the initial states of the stages of the register.

Clearly, if $m$ is 2 the arrangement shown in FIG. 1 is a conventional linear feedback shift register in which each register stage stores a binary value, either a 0 or a 1 and is either connected or not connected to unit 12 which is a modulo-2 unit. That is, the arrangement of FIG. 1 is a binary LFSR. If, however, $m$ is an integer, greater than 2, the arrangement of FIG. 1 can be thought of as a $m$-ary linear feedback shift register or simply a $m$-ary LFSR, since any stage can assume any of m states, and unit 12 is a modulo-$m$ summer unit. Herebefore an $m$-ary LFSR could not be reduced to practice since to date there is no physical device which is capable of assuming any one of $m$ states where $m$ is greater than 2 yet be fast and reliable, as known binary devices.

The advantages of a $m$-ary LFSR if one could be built should be appreciated by those familiar with the art. A $m$-ary LFSR can provide nonbinary recurring sequences, not feasible with binary LFSRs. Also, sequences of lengths which fall between maximal length binary sequences can be generated with a $m$-ary LFSR. For example, with binary LFSRs of 3, 4, 5, 6, 7 and 8 stages, maximal length sequences of 7, 15, 31, 63, 127 and 255 states can be generated based on the formula $2^r-1$, where $r$ is the number of register stages. Yet, with a $m$-ary LFSR, in which $m$ is a prime ($m=p$), maximal length sequences, falling between these values, could be generated. For example with $m=p=3$, the maximal length sequence is $3^r-1$. Thus, with registers of 2, 3, 4 and 5 stages, sequences of 8, 26, 80 and 242 states can be generated. Clearly, with different values of $m$ and $r$ and different feedback connections, the number of sequences which could be generated is very great. However, herebefore none of these were practical due to the 2-state limitation of practical devices.

These limitations are eliminated by the present invention which enables the simulation of a $m$-ary LFSR with binary devices. The basic principles of the invention may best be highlighted with a specific example. Let it be assumed that it is desired to simulate the performance of a three stage ternary LFSR, such as the one shown in FIG. 2, wherein the three stages of register 20 are designated as $a_{k-1}$, $a_{k-2}$ and $a_{k-3}$. Therein, $a_k$ represents the feedback digit from a mod-3 unit 22. Stage $a_{k-1}$ is connected directly to unit 22 through C1 which provides a multiplication factor of 1 and $a_{k-3}$ is connected through C3 which provides a multiplication factor of 2. Stage $a_{k-2}$ of register 20 is not fed back to unit 22. Theoretically it can be thought of as being connected to unit 22 through a multiplier C2 (not shown) with a multiplication factor of zero.

The ternary linear recurrence relation can be expressed as:

$$a_k = a_{k-1} + 2a_{k-3} \bmod 3.$$

The theoretical state table for such a ternary LFSR is charted in the first five columns from the left in FIG. 3. It is thus seen that for an initial state at 002 at time $k=0$, a maximal length sequence of 26 (0–25) can be theoretically generated.

In accordance with the present invention the state of each register stage and the feedback digit $a_k$ are coded in binary for each times $k=0$ through $k=25$. Since $m=3$ a 2-bit code is needed. The coded states and feedback digits are listed in the five columns from the right of FIG. 3. The entries under $x_{k-1}$ and $y_{k-1}$ represent the 2 binary digits of the entries under $a_{k-1}$, $x_{k-2}$ and $y_{k-2}$ for the $a_{k-2}$ entries, $x_{k-3}$ and $y_{k-3}$ for the $a_{k-3}$ entries and $x_k y_k$ for the $a_k$ entries. Therein the $x$'s entries represent the higher order digits and the $y$'s entries the lower order digits of the binary representation.

Figure 4:
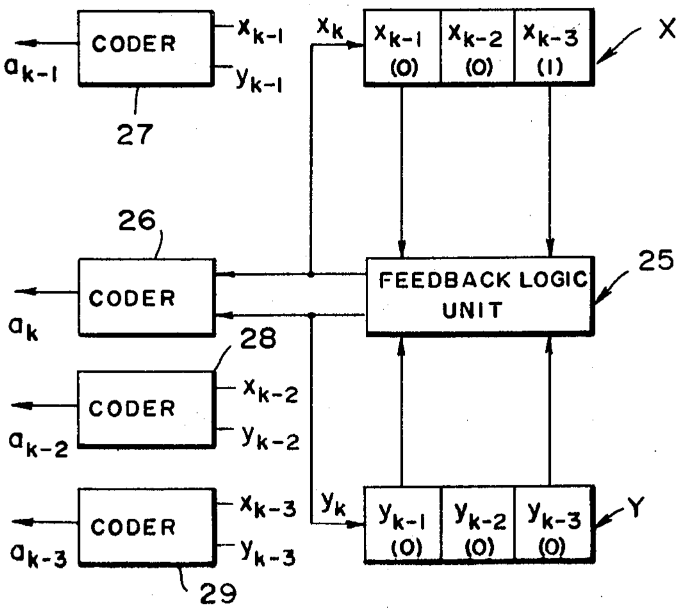
FIG. 4 is a block diagram of a ternary LFSR with binary logic in accordance with the present invention.

In accordance with the present invention two parallel 3-bit binary shift registers X and Y are provided as shown in FIG. 4. The stages of register X are designated $x_{k-1}$, $x_{k-2}$ and $x_{k-3}$ while those of register Y are designated $y_{k-1}$, $y_{k-2}$ and $y_{k-3}$. The outputs of stages of the two registers, which correspond to stages of register 20 which are connected to unit 22 through multipliers with nonzero factors, i.e., through nonzero multipliers, are supplied to a feedback logic unit 25. The outputs of unit 25 are the feedbacks $x_k$ and $y_k$ to registers X and Y, respectively. Since in register 20 only stages $a_{k-1}$ and $a_{k-3}$ are fed back through nonzero multiplication factors, only stages $x_{k-1}$ and $x_{k-3}$ of register X and stages $y_{k-1}$ and $y_{k-3}$ of register Y are fed back to unit 25.

It is thus seen that $x_k$ and $y_k$ are functions of only four of the six stages of the two registers. They are provided by the logic unit 25 as a function of the combined states of these four stages, i.e., $x_{k-1}$, $x_{k-3}$, $y_{k-1}$ and $y_{k-3}$. For example, $x_k$ is made a 1 only when the combined states of these four stages are in any one of 9 combinations at times $k=4$, 7, 13, 14, 15, 18, 19, 21 and 23 and is 0 in all the others. Similarly, $y_k$ is a 1 only for given combinations of these four stages and is a 0 for all others. It should be apparent to logic designers that $x_k$ and $y_k$ can be generated by considering each of the 26 combinations of the states of $x_{k-1}$, $x_{k-3}$, $y_{k-1}$ and $y_{k-3}$ separately. Preferably however, the states can be plotted on a Karnaugh chart or map to simplify the logic implementation.

It should be appreciated that the binary values of $x_k$ and $y_k$ can be recoded by a coder 26 to generate the nonbinary recurring sequence $a_k$, while the outputs of corresponding stages of the two registers, such as $x_{k-1}$ and $y_{k-1}$, $x_{k-2}$ and $y_{k-2}$ and $x_{k-3}$ and $y_{k-3}$ can be recoded separately by coders 27, 28 and 29 to provide the nonbinary values of $a_{k-1}$, $a_{k-2}$ and $a_{k-3}$.

Figure 2:
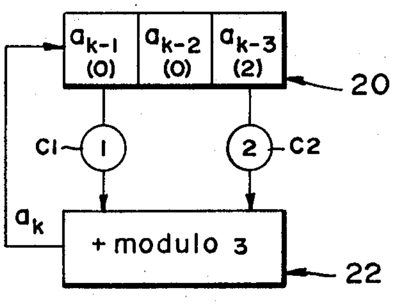
FIG. 2 is a simple block diagram of a ternary LFSR without binary logic.

It is thus seen that the arrangement, shown in FIG. 4, truly generates the sequence which would have been generated by the ternary LFSR, shown in FIG. 2, except that herein it is generated with two binary registers and with interconnected binary logic feedback. Therefore the arrangement shown in FIG. 4 can be thought of as a ternary LFSR with binary logic.

It should be appreciated that the invention is not limited to the single arrangement shown in FIG. 4. It is applicable to the simulation of any $m$-ary LFSR. Based on the desired sequence the state table for the $m$-ary LFSR is charted. Then it is coded in binary to determine successive stages associated with the sequence as well as the feedback digits which are then generated by a feedback logic control unit, designed to provide the proper feedback to each of the registers.

Mathematically it can be shown that when $m$ is a product of two or more distinct primes, i.e., $p_1 \cdot p_2$, etc., the selected recurrence relation for $m$ can be decomposed into separate p recurrence relations which can be treated separately. For example, for $m = 10$, a 10-ary LFSR can be implemented with four parallel binary registers, since $2^3 < 10 < 2^4$, and with a single interconnected feedback unit with four feedback outputs, in a manner analogous to that of FIG. 4. However, since $10 = 2 \times 5$, the same sequence can be derived with one 2-ary LFSR, i.e., a simple binary LFSR and with one 5-ary LFSR with binary logic, consisting of three parallel registers ($2^2 < 5 < 2^3$) with interconnected feedback. The latter arrangement may in some instances be preferred to simplify the complexity of the feedback logic.

These aspects may further be explained with specific examples. Assuming a cycle structure or nonbinary recurrence relation or sequence $a_k = a_{k-1} + a_{k-2}$ mod-10 and an initial state of 19, i.e., $a_{-1} = 1$, $a_{-2}=9$, it is clear that a state table can be provided therefore as shown in FIG. 5. Theoretically this nonbinary recurrence relation can be generated by a 10-ary LFSR 30 as shown in FIG. 5a wherein A represents a two-stage register, each stage capable of assuming any of 10 states. Each of the stages is connected directly (multiplication factor of 1) to a feedback modulo-10 summer 31.

The analogous sequence can be generated by coding each state and each feedback digit in binary, as represented in FIG. 6 shown only for $k = 0$ through $k = 10$. Each state is coded into a four-bit binary representation *mnpq*. Four registers M, N, P and Q are employed as shown in FIG. 7 with a feedback unit 32 which provides $m_k$, $n_k$, $p_k$ and $q_k$ feedbacks to the four registers, to generate the binary coded sequence. Since in the theoretical 10-ary LFSR 30, shown in FIG. 5*a*, each of the stages of register A is fed back through a nonzero multiplier to the modulo-10 summer 31, each of the stages of each of registers M, N, P and Q is fed back to unit 32. It is clear that unit 32 provides the feedbacks as a function of eight Boolean or state-variables.

This arrangement can be simplified by generating a cycle structure $b_k = b_{k-1} + b_{k-2}$ mod-2 and a cycle structure $d_k = d_{k-1} + d_{k-2}$ mod-5 with an arrangement as shown in FIG. 8. The binary cycle structure is provided by a binary LFSR 33, consisting of a B register and a modulo-2 summer 34 and the cycle structure $d_k = d_{k-1} + d_{k-2}$ mod-5 is theoretically provided by a 5-ary LFSR 35. The latter consists of a two stage register D, each stage capable of assuming any of 5 states and a modulo-5 summer 36. Since in the theoretically 10-ary LFSR of FIG. 5*a* each of the stages of register A are connected to the modulo-10 summer, each of the two stages of each of registers B and D is connected to its associated summer. Each digit of the initial state 19 of register A is reduced modulo-2 to provide an initial state 11 for register B and is reduced modulo-5 to provide an initial state of 14 for register D.

The resulting truth table of the binary cycle of the binary LFSR 33 is shown in FIG. 9 and the state table of the 5-ary LFSR 35 with its corresponding binary coded states and feedback digits are shown in FIG. 10. The 5-ary LFSR 35 is implemented with binary registers X, Y and Z as shown in FIG. 11, and with a feedback unit 38 which provides only three feedbacks $x_k$, $y_k$ and $z_k$, as a function of only 6 states or values (of registers X, Y and Z). Thus, it is simpler than unit 32 of FIG. 7, which provides four outputs as a function of eight state-variables.

Attention is again directed to FIG. 5. The entries under $a_k$ represent 60 steps or states of the infinite sequence 0, 1, 1, 2, 3, 5, 8, 13, 21, 34, 55 . . . . known as the Fibonacci sequence, reduced modulo-10. According to the present invention, these states of the Fibonacci sequence may be generated by either the embodiment shown in FIG. 7 or by the 5-ary LFSR with binary logic, shown in FIG. 11, together with the binary LFSR 33 shown in FIG. 8. In either embodiment the feedback digits can be recoded into decimal digits to provide the various values of the Fibonacci sequence.

As is known the Fibonacci sequence has many useful properties. Among some of its applications are random number generation and sort merge strategy for data by means of a general, purpose digital computer. Thus the present invention provides means for generating a significant number of states in the Fibonacci sequence with binary logic elements.

Summarizing the foregoing description in accordance with the present invention, $m$-ary LFSRs with binary logic elements are provided to generate nonbinary recurring sequences. Based on the desired nonbinary recurring sequence which is theoretically producable by a register of r stages, each capable of assuming any of $m$ states, with feedback of selected stages through nonzero multipliers which are modulo-$m$ added to provide a feedback digit to the register, the sequence's state table is produced. Each state therein and the feedback digit are coded in binary to provide a corresponding binary-coded sequence. A plurality of binary registers, equal in number to or greater than $\log_2 m$, each with $r$ binary stages are employed. The states of corresponding stages of all the registers are supplied to a single feedback logic unit which provides a binary feedback digit to each of the registers. The combination of states of the registers cycles through a sequence of binary states which corresponds to the states associated with the nonbinary recurring sequence. The novel combination with a plurality of registers may also be thought of as a combination of equal length binary shift registers, with a feedback logic unit which provides a separate feedback binary digit to each register which is a function of the states of corresponding stages of all the registers.

The invention may further be summarized by expressing a nonbinary recurring sequence as $$a_k = \sum_{i=1}^{r} c_i a_{k-1} \bmod m$$

Such a sequence can be generated theoretically by a $m$-ary LFSR without binary logic. Therein $r$ represents the number of stages of the register. Each stage $a_{k-i}$ is capable of assuming any of $m$ states. $a_k$ is the modulo $m$ of the states of the stages which are fed back through nonzero multipliers $c_i$. In accordance with the present invention such a sequence is practically implementable by a $m$-ary LFSR with binary logic. Such an arrangement includes $W$ registers ($W \geq \log_2 m$), each of $r$ binary stages, and a single feedback logic unit. The latter is supplied with corresponding stages of the $W$ registers which correspond to the $a_{k-i}$ stages with nonzero multipliers in the theoretical $m$-ary LFSR without binary logic utilizing sum modulo-$m$ feedback. The single feedback logic unit provides a feedback binary digit to each of the $W$ registers, with all the feedback bits representing $a_k$ in binary, which can be coded into an $m$-type representation or code.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A binary logic arrangement comprising:
   a plurality of binary shift registers, each of r binary stages; and
   feedback means coupled to corresponding stages of all of said registers for providing a separate feedback binary digit to each register as a function of the states of the stages coupled to said feedback means.

2. A binary logic arrangement as recited in claim 1 wherein each register stage is settable in a selected initial binary state, and means for clocking said registers' stages to provide a binary sequence corresponding to a selected nonbinary recurring sequence.

3. A binary logic arrangement as recited in claim 2 wherein the number of registers is definable as $W$, $W \geq \log_2 p$, wherein $p$ is a distinct prime, greater than 2.

4. A binary logic arrangement as recited in claim 3 wherein the stages of said $W$ registers are settable to selected initial binary states whereby the length of the sequence provided by said arrangement is $p^r-1$.

5. A binary logic arrangement as recited in claim 2 wherein the number of registers is definable as $W$, $W \geq \log_2 m$, wherein $m$ is an integer greater than 2.

6. A $m$-ary linear feedback shift register for providing a recurring sequence, which is analogous to a nonbinary recurring sequence, in binary representation, wherein m is an integer greater than 2, comprising:
   a plurality of binary shift registers, each of $r$ stages, with corresponding stages in said registers settable to initial binary states which are functions of the initial states of said nonbinary recurring sequence;
   feedback means coupled to selected stages of said registers, with corresponding stages of said registers being coupled to said feedback means for providing a separate feedback binary digit to each of said registers as a function of the states of the stages connected thereto; and
   means for clocking said registers whereby each register advances through a sequence of states, with the states of corresponding stages of said registers representing in binary a nonbinary recurring sequence, modulo-$m$.

7. The arrangement as recited in claim 6 wherein said nonbinary recurring sequence is definable as $$a_k = \sum_{i=1}^{r} c_i a_{k-1} \bmod m$$

$a_k$ being the sum modulo $m$ of the states of a register, definable as A, of r stages, which are summed modulo-$m$ through nonzero multipliers $c_i$, each stage of register A being capable of assuming any of m states and the feedback binary digits provided by said feedback means representing $a_k$ in binary.

8. The arrangement as recited in claim 7 wherein the number of said binary registers is $W$, $W \geq \log_2 m$, and said feedback means is coupled to corresponding stages of said $W$ registers which correspond to stages $a_{k-i}$ connected through nonzero multipliers for the modulo-$m$ summation.

9. The arrangement as recited in claim 6 wherein $m = p$, $p$ being a prime integer and the nonbinary recurring sequence is definable as $$a_k = \sum_{i=1}^{r} c_i a_{k-i} \bmod p$$

$a_k$ representing the feedback digit from a feedback unit which provides the sum modulo-$p$ of the states of a register definable as A of $r$ stages, connected to the feedback unit through $r$ multipliers, selected ones of said multipliers providing nonzero multiplication factors, each stage of the A register being capable of assuming any of $p$ states, and $a_k$ being fed back as the input to said A register, with the feedback binary digits from said feedback means representing $a_k$ in binary.

10. The arrangement as recited in claim 9 wherein the number of said binary registers is $W$, $W \geq \log_2 p$, and said feedback means is coupled to the stages of each of said $W$ registers which correspond to the stages of said A register which are connected to the feedback unit. Providing $a_k$, through nonzero multipliers.

11. The method of providing a binary representation of a nonbinary recurring sequence of the type providable by a $m$-ary linear feedback shift register comprising a register A of $r$ states, each stage being capable of assuming any of $m$ states and a feedback unit which provides a feedback digit, definable as $a_k$, which is a function of the states of selected stages connected to the feedback unit through nonzero multipliers, the steps comprising:
   coding in binary states of said $r$ stages and the $a_k$ in said nonbinary recurring sequence which starts from an initial state to which the $r$ stages of said A register are set;
   providing $W$ binary shift registers, each of $r$ states, corresponding stages of said $W$ registers being set to represent in binary the initial states of the $r$ stages of said A register; and
   providing a feedback binary digit to each of said $W$ registers as a function of the states of selected stages of said $W$ registers, whereby the feedback binary digits represent $a_k$ in binary.

* * * * *